US007509200B2

(12) United States Patent
Ito et al.

(10) Patent No.: US 7,509,200 B2
(45) Date of Patent: Mar. 24, 2009

(54) CONTROL DEVICE OF INTERNAL COMBUSTION ENGINE

(75) Inventors: Masahiro Ito, Toyota (JP); Hisao Iyoda, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 330 days.

(21) Appl. No.: 11/339,614

(22) Filed: Jan. 26, 2006

(65) Prior Publication Data

US 2006/0183598 A1 Aug. 17, 2006

(30) Foreign Application Priority Data

Feb. 15, 2005 (JP) ............................ 2005-037891

(51) Int. Cl.
*G06F 7/00* (2006.01)

(52) U.S. Cl. ............................ 701/51; 701/54; 477/116

(58) Field of Classification Search .................. 701/51, 701/54, 66; 192/3.51; 477/116
See application file for complete search history.

(56) References Cited

U.S. PATENT DOCUMENTS 5,668,727 A * 9/1997 Pellerito et al. ............ 701/105
6,799,108 B2 * 9/2004 Aldrich et al. ................ 701/51
2002/0082759 A1 * 6/2002 Katakura et al. .............. 701/54
2002/0133281 A1 * 9/2002 Kotwicki et al. .............. 701/54
2004/0143384 A1 * 7/2004 Graf et al. ..................... 701/51
2005/0143888 A1 * 6/2005 Jeon ............................ 701/54

FOREIGN PATENT DOCUMENTS

| | | |
|---|---|---|
| JP | 4-5447 | 1/1992 |
| JP | 9-158772 | 6/1997 |
| JP | 11-193732 | 7/1999 |

* cited by examiner

*Primary Examiner*—Mark Hellner
(74) *Attorney, Agent, or Firm*—Oblon, Spivak, McClelland, Maier & Neustadt, P.C.

(57) ABSTRACT

When an engine is in an idle state and a drive range is selected in transmission (i.e. during idle control), an idle controlling portion of an engine ECU calculates a target power for controlling a power of the engine to keep it constant, and outputs the calculated target power to an engine controlling portion. The engine controlling portion controls the power of the engine based on the target power calculated by the idle controlling portion during idle control.

18 Claims, 4 Drawing Sheets

CONTROL DEVICE OF INTERNAL COMBUSTION ENGINE

This nonprovisional application is based on Japanese Patent Application No. 2005-037891 filed with the Japan Patent Office on Feb. 15, 2005, the entire contents of which are hereby incorporated by reference.

BACKGROUND OF THE INVENTION

1. Field of the Invention

The present invention relates to a control device of an internal combustion engine, and particularly to a control device of an internal combustion engine, the control device controlling a power from the internal combustion engine coupled to an automatic transmission.

2. Description of the Background Art

Conventionally, a torque required for an engine has accurately been calculated to control the engine based on the calculated torque (target torque).

Japanese Patent Laying-Open No. 09-158772 discloses a control device of a diesel engine, the control device being capable of improving detection accuracy of an engine load. In the control device, an input shaft rotational speed (engine rotational speed) and an output shaft rotational speed (turbine rotational speed) of a torque converter coupled to the diesel engine are detected. Based on the detected input and output shafts rotational speeds of the torque converter, a velocity ratio is calculated. Based on the calculated velocity ratio, and by using a table showing a relation between the velocity ratio and the capacity coefficient of the torque converter, a capacity coefficient of the torque converter is calculated. Thereafter, based on the input shaft rotational speed (engine rotational speed) and the calculated capacity coefficient of the torque converter, an engine torque is calculated. The calculated engine torque is used as an engine load to control the diesel engine.

This control device focuses attention on the fact that an engine torque can be estimated by using a velocity ratio of the input and output shafts of the torque converter of the automatic transmission and a capacity coefficient specific to the torque converter. According to the control device, an engine load is accurately detected based on the detected input shaft rotational speed (engine rotational speed) and the detected output shaft rotational speed (turbine rotational speed) of the torque converter, which improves control accuracy in the diesel engine.

In a vehicle on which an automatic transmission with a torque converter is mounted, control has conventionally been provided to stabilize a power of an engine when the engine is in an idle state (an accelerator pedal is fully released) and when a drive range is selected in the automatic transmission (hereinafter this type of control is also referred to as "idle control"). In other words, the idle control is provided to stabilize the idle state of the engine when the vehicle is stopped (a drive range is selected) and when the vehicle creeps.

However, if the idle control above is provided to a vehicle having a gasoline engine mounted thereon, and the control method disclosed in the above-described Japanese Patent Laying-Open No. 09-158772 is applied, the following problem arises.

The control method disclosed in the Japanese Patent Laying-Open No. 09-158772 provides feedback control in which an engine load (engine torque) is controlled based on detected values of the input shaft rotational speed (engine rotational speed) and the output shaft rotational speed (turbine rotational speed) of the torque converter, resulting in control delay. Particularly if this control method is used to provide idle control in the gasoline engine, which has a generally slower torque response than a diesel engine, hunting may occur. Furthermore, the control method above requires integral control for controlling the engine load so that the engine load takes a target value during idle control. The integral operation is continually performed, resulting in enormous computational load.

SUMMARY OF THE INVENTION

The present invention is thus made to deal with the problems above. An object of the present invention is to provide a control device of an internal combustion engine, the control device stabilizing a power of the internal combustion engine during idle control.

According to the present invention, a control device of an internal combustion engine is a control device of an internal combustion engine, the control device controlling a power from the internal combustion engine coupled to an automatic transmission, including: a controlling portion controlling the power from the internal combustion engine; and a target power setting portion setting in the controlling portion a target power for controlling the power from the internal combustion engine to keep the power from said internal combustion engine constant when a drive range is selected in the automatic transmission in an idle state of the internal combustion engine. The controlling portion controls the power from the internal combustion engine based on the target power when the drive range is selected in the idle state.

In the control device of the internal combustion engine according to the present invention, when the internal combustion engine is in the idle state and when a drive range is selected in the automatic transmission (i.e. during idle control), a power from the internal combustion engine is controlled to be kept constant. An output torque during idle control is thereby stabilized. In other words, an output torque of the internal combustion engine during idle control is at the maximum when the vehicle speed is zero (when the turbine rotational speed of a torque converter is zero). When the vehicle starts creeping, the turbine rotational speed is increased and the velocity ratio of the torque converter is increased accordingly, and hence the output torque is decreased (note that the output torque is increased when the vehicle is decelerated, and that the output torque reaches the maximum when the vehicle is stopped). If feedback control of the torque is provided to obtain accurate control of the output torque during idle control, the problem of hunting may arise as described above. However, the control device of the internal combustion engine does not control the torque itself that varies during idle control. Instead, the control device sets a target power and controls the internal combustion engine such that a power from the internal combustion engine is kept constant. Accordingly, the output torque is much more stabilized.

Therefore, with the control device of the internal combustion engine according to the present invention, a power from the internal combustion engine during idle control is stabilized.

Preferably, the target power is a power required to achieve a target vehicle speed during creeping.

Preferably, the target power is a power required to maintain a rotational speed of the internal combustion engine at a prescribed value when a vehicle speed is zero.

In the control device of the internal combustion engine, a target power is set during idle control based on a certain state (a state where the vehicle speed converges during creeping or a state where the vehicle is stopped). Accordingly, with the control device of the internal combustion engine, an appropriate power can be ensured during idle control.

Preferably, the automatic transmission includes a fluid coupling coupled to an output shaft of the internal combustion engine, and a transmission mechanism coupled to an output shaft of the fluid coupling. The target power setting portion includes a torque calculating portion, when a drive range is selected in the transmission mechanism in the idle state, calculating a target value of an output torque from the internal combustion engine based on a first target rotational speed (target engine rotational speed) indicating a target rotational speed of the internal combustion engine and a second target rotational speed (target turbine rotational speed) indicating a target rotational speed of the output shaft of the fluid coupling, and a target power calculating portion calculating the target power based on the calculated target value of the output torque and the first target rotational speed (target engine rotational speed).

In the control device of the internal combustion engine, the torque calculating portion calculates a target value of the output torque from the internal combustion engine during idle control. The target power calculating portion then uses the calculated target value of the output torque to calculate the target power. Accordingly, the target power can accurately be calculated. With this control device of the internal combustion engine, a desired target power can accurately be set.

Preferably, the second target rotational speed (target turbine rotational speed) is calculated based on a target vehicle speed during creeping.

Preferably, the second target rotational speed (target turbine rotational speed) is zero.

In the control device of the internal combustion engine, a target power is set during idle control. The target power is based on a prescribed state where the second target rotational speed (target turbine rotational speed) indicating a target rotational speed of the output shaft of the fluid coupling takes a constant value. With the control device of the internal combustion engine, an appropriate power can be ensured during idle control.

Preferably, the torque calculating portion includes a velocity ratio calculating portion calculating a velocity ratio of an input shaft and the output shaft of the fluid coupling based on the first and second target rotational speeds (the target engine rotational speed and the target turbine rotational speed), a capacity coefficient calculating portion calculating a capacity coefficient of the fluid coupling based on the calculated velocity ratio, and a computing portion computing the target value of the output torque based on the calculated capacity coefficient and the first target rotational speed (target engine rotational speed).

In the control device of the internal combustion engine, the first and second target rotational speeds (the target engine rotational speed and the target turbine rotational speed) indicating target rotational speeds of the input and output shafts of the fluid coupling, respectively, and the capacity coefficient of the fluid coupling are used to accurately calculate the target torque of the internal combustion engine. Accordingly, the target power can be calculated more accurately during idle control. With the control device of the internal combustion engine, the desired target power can be set more accurately.

Preferably, the internal combustion engine includes a gasoline engine.

In the control device of the internal combustion engine, the varying torque itself is not controlled during idle control. Instead, a target power is set to control the internal combustion engine such that a power of the internal combustion engine is kept constant. Accordingly, even if the internal combustion engine is a gasoline engine having a slow torque response, control is kept stable. Therefore, with the control device of the internal combustion engine, a power of the internal combustion engine during idle control is stabilized.

As described above, with the control device of the internal combustion engine according to the present invention, a target power is set during idle control to control the internal combustion engine such that the power thereof is kept constant. An output torque is therefore stabilized, and a power of the internal combustion engine during idle control is stabilized accordingly.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
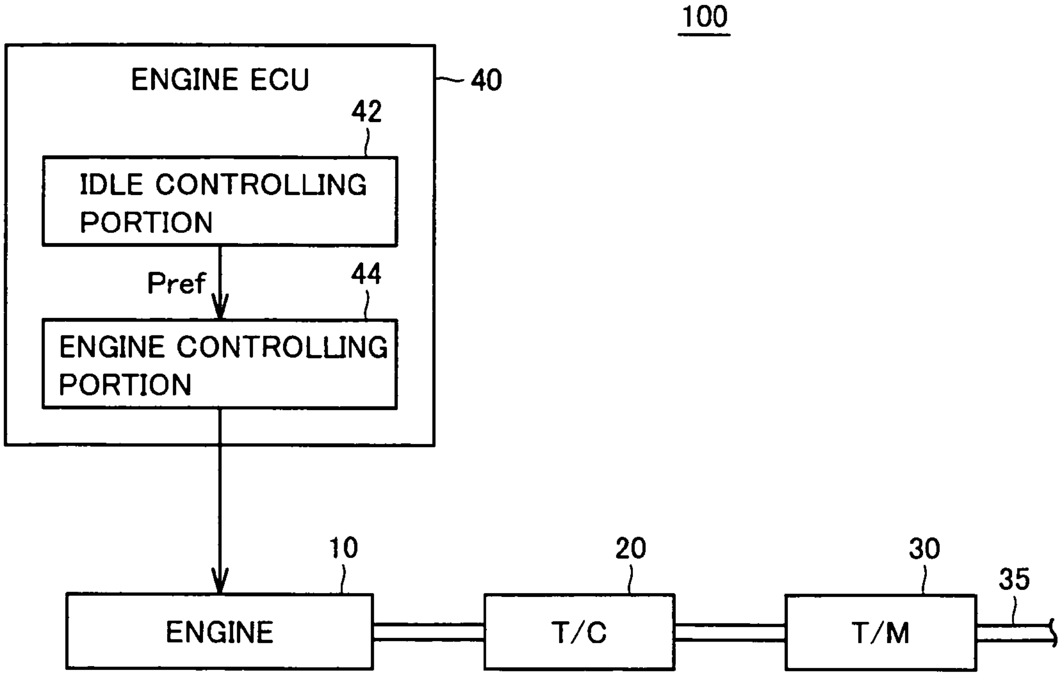
FIG. 1 is a general block diagram of an engine system according to a first embodiment of the present invention.

In the following, the present embodiments according to the present invention will be described in detail with reference to the drawings. The similar portions or corresponding portions in the drawings are provided with the same reference characters, and the description thereof will not be repeated.

First Embodiment

FIG. 1 is a general block diagram of an engine system according to a first embodiment of the present invention. Referring to FIG. 1, this engine system 100 includes an engine 10, a torque converter 20, a transmission 30, and an engine Electronic Control Unit (ECU) 40. Engine 10 is coupled to a pump impeller (not shown, the same applies below) of torque converter 20. Transmission 30 is coupled to a turbine runner (not shown, the same applies below) of torque converter 20. A propeller shaft 35 for transmitting a torque to drive wheels is coupled to transmission 30.

Engine 10 is a gasoline engine in which air taken in through an inlet pipe (not shown, the same applies below) is mixed with fuel (gasoline) from a fuel tank (not shown) to provide air-fuel mixture and the air-fuel mixture is supplied to a cylinder. Based on a control command from engine ECU 40, engine 10 operates a throttle valve provided at the inlet pipe, an ignition device, a fuel injection device and the like (all not shown) to generate motive power and outputs the generated motive power to torque converter 20.

Torque converter 20 includes a pump impeller coupled to an output shaft of engine 10, a turbine runner coupled to an input shaft of transmission 30, and a stator (not shown), and transmits a torque from engine 10 to transmission 30 via a fluid (oil) with which torque converter 20 is filled.

Transmission 30 changes the rotational speed and the torque to be transmitted to a propeller shaft 35 based on a control command from a transmission ECU (not shown). Transmission 30 may be a gear-type stepwise transmission determining a transmission ratio in a discrete manner, or a continuously variable transmission determining a transmission ratio in a continuous manner.

Engine ECU 40 includes an idle controlling portion 42 and an engine controlling portion 44. When engine 10 is in an idle state and when a drive range is selected in transmission 30, in other words, during idle control, idle controlling portion 42 calculates a target power Pref for controlling a power of engine 10 so that the power of engine 10 is kept constant and outputs the calculated target power Pref to engine controlling portion 44. The way how to calculate target power Pref is described in detail in the following.

During idle control, engine controlling portion 44 generates a control command for engine 10 (e.g. an opening command for a throttle valve and an ignition command for an ignition device) based on target power Pref calculated by idle controlling portion 42, and outputs the generated control command to engine 10.

Figure 2:
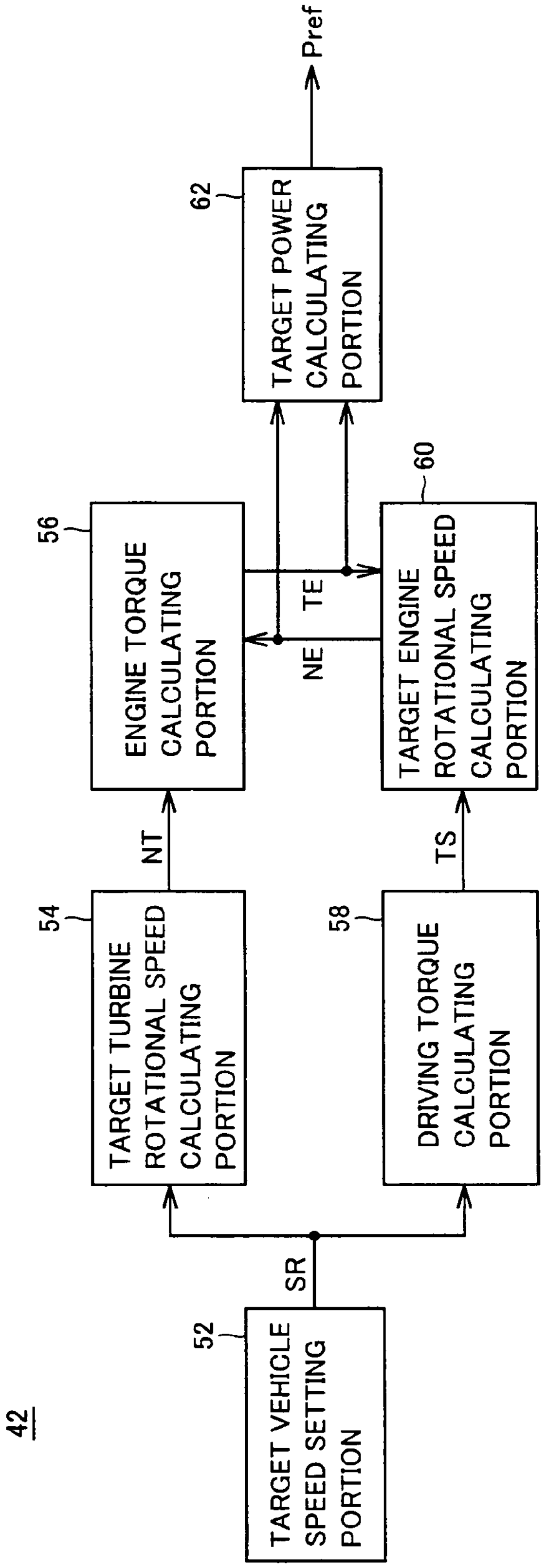
FIG. 2 is a functional block diagram of an idle controlling portion shown in FIG. 1.

FIG. 2 is a functional block diagram of idle controlling portion 42 shown in FIG. 1. Referring to FIG. 2, idle controlling portion 42 includes a target vehicle speed setting portion 52, a target turbine rotational speed calculating portion 54, an engine torque calculating portion 56, a driving torque calculating portion 58, a target engine rotational speed calculating portion 60, and a target power calculating portion 62.

Target vehicle speed setting portion 52 sets a target vehicle speed SR to be obtained during creeping (on a flat road), and outputs the set target vehicle speed SR to target turbine rotational speed calculating portion 54 and driving torque calculating portion 58. Although target vehicle speed SR is basically a constant value, it may also be changed to a desired value.

Target turbine rotational speed calculating portion 54 receives target vehicle speed SR from target vehicle speed setting portion 52, and based on the received target vehicle speed SR, calculates a target turbine rotational speed NT. Specifically, target turbine rotational speed calculating portion 54 receives from a transmission ECU, not shown, a transmission ratio of transmission 30 (or a gear ratio if a gear-type stepwise transmission is used) obtained during creeping, and multiplies the received transmission ratio by target vehicle speed SR to calculate target turbine rotational speed NT. Target turbine rotational speed calculating portion 54 then outputs the calculated target turbine rotational speed NT to engine torque calculating portion 56.

Engine torque calculating portion 56 receives target turbine rotational speed NT from target turbine rotational speed calculating portion 54, and a target engine rotational speed NE from target engine rotational speed calculating portion 60. Engine torque calculating portion 56 then, based on the received target turbine rotational speed NT and target engine rotational speed NE, calculates an engine torque TE to be obtained at target vehicle speed SR, and outputs the calculated engine torque TE to target power calculating portion 62 and target engine rotational speed calculating portion 60.

Driving torque calculating portion 58 receives target vehicle speed SR from target vehicle speed setting portion 52, and calculates a driving torque TS determined by a running resistance obtained when the vehicle is driven at the received target vehicle speed SR. Specifically, driving torque calculating portion 58 uses a preset map showing a vehicle speed and a driving torque determined by a running resistance obtained when the vehicle is driven, and calculates driving torque TS based on target vehicle speed SR. Driving torque calculating portion 58 then outputs the calculated driving torque TS to target engine rotational speed calculating portion 60.

Target engine rotational speed calculating portion 60 receives driving torque TS from driving torque calculating portion 58 and engine torque TE from engine torque calculating portion 56, and based on the received driving torque TS and engine torque TE, calculates target engine rotational speed NE. Specifically, target engine rotational speed calculating portion 60 calculates target engine rotational speed NE enabling engine torque TE and driving torque TS to counterbalance each other. Target engine rotational speed calculating portion 60 then outputs the calculated target engine rotational speed NE to target power calculating portion 62 and engine torque calculating portion 56.

Target power calculating portion 62 receives engine torque TE from engine torque calculating portion 56 and target engine rotational speed NE from target engine rotational speed calculating portion 60. Target power calculating portion 62 then, based on the received engine torque TE and target engine rotational speed NE, calculates a target power Pref to be output by engine 10, and outputs the calculated target power Pref to engine controlling portion 44 of engine ECU 40 not shown.

Figure 3:
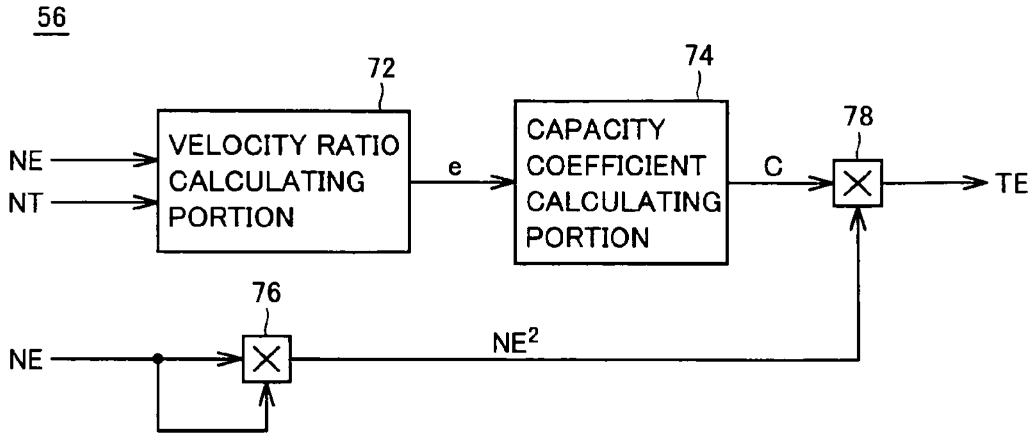
FIG. 3 is a detailed functional block diagram of an engine torque calculating portion shown in FIG. 2.

FIG. 3 is a detailed functional block diagram of engine torque calculating portion 56 shown in FIG. 2. Referring to FIG. 3, engine torque calculating portion 56 includes a velocity ratio calculating portion 72, a capacity coefficient calculating portion 74, and multiplication portions 76, 78. Velocity ratio calculating portion 72 receives target engine rotational speed NE and target turbine rotational speed NT from target engine rotational speed calculating portion 60 and target turbine rotational speed calculating portion 54, respectively, shown in FIG. 2. Velocity ratio calculating portion 72 divides target turbine rotational speed NT by target engine rotational speed NE to calculate a velocity ratio e to be obtained at torque converter 20, and outputs the calculated velocity ratio e to capacity coefficient calculating portion 74.

Capacity coefficient calculating portion 74 uses a preset map showing a relation between a capacity coefficient and a velocity ratio of torque converter 20 so as to calculate a capacity coefficient C of torque converter 20 based on velocity ratio e from velocity ratio calculating portion 72, and then outputs the calculated capacity coefficient C to multiplication portion 78.

Multiplication portion 76 calculates a square value of target engine rotational speed NE, and outputs the calculated square value of target engine rotational speed NE to multiplication portion 78. Multiplication portion 78 multiplies capacity coefficient C of torque converter 20 from capacity coefficient calculating portion 74 by the square value of target engine rotational speed NE from multiplication portion 76 to calculate engine torque TE, and then outputs the calculated engine torque TE to target power calculating portion 62 and target engine rotational speed calculating portion 60 shown in FIG. 2.

Figure 4:
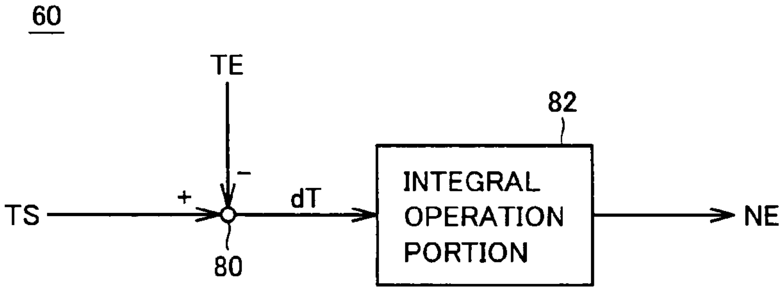
FIG. 4 is a detailed functional block diagram of a target engine rotational speed calculating portion shown in FIG. 2.

FIG. 4 is a detailed functional block diagram of target engine rotational speed calculating portion 60 shown in FIG. 2. Referring to FIG. 4, target engine rotational speed calculating portion 60 includes a subtraction portion 80 and an integral operation portion 82. Subtraction portion 80 subtracts engine torque TE provided by engine torque calculating portion 56 from driving torque TS provided by driving torque calculating portion 58 shown in FIG. 2, and outputs a difference value dT to integral operation portion 82.

Integral operation portion 82 multiplies difference value dT from subtraction portion 80 by a prescribed operational gain, and totalize the value multiplied by the operational gain. Integral operation portion 82 then outputs the totalized value as target engine rotational speed NE to target power calculating portion 62 and engine torque calculating portion 56 shown in FIG. 2.

As shown in FIGS. 2-4, engine torque calculating portion 56 and target engine rotational speed calculating portion 60 use each other's outputs to calculate engine torque TE and target engine rotational speed NE, respectively. A flow of an operational logic shown in FIGS. 2 to 4 will be described. Engine torque calculating portion 56 calculates engine torque TE that corresponds to a certain engine rotational speed, and outputs the calculated engine torque TE to target engine rotational speed calculating portion 60.

If engine torque TE from engine torque calculating portion 56 is smaller than driving torque TS that corresponds to target vehicle speed SR, target engine rotational speed calculating portion 60 changes the value of target engine rotational speed NE such that target engine rotational speed NE is increased by subtraction portion 80 and integral operation portion 82. Target engine rotational speed calculating portion 60 then outputs the changed target engine rotational speed NE to engine torque calculating portion 56.

Engine torque calculating portion 56 uses the changed target engine rotational speed NE from target engine rotational speed calculating portion 60 to calculate engine torque TE again (the calculated value is larger than the value previously calculated), and outputs the calculated engine torque TE to target engine rotational speed calculating portion 60 again.

By performing such operations repeatedly, engine torque TE which counterbalances driving torque TS that corresponds to target vehicle speed SR, and target engine rotational speed NE that corresponds to the above-described engine torque TE are calculated. Integral operation portion 82 is provided to prevent a stationary error from remaining when target engine rotational speed NE is calculated.

The reason why such an operational logic is used is as follows. The relation between the vehicle speed and the engine rotational speed is not linear, and hence target engine rotational speed NE cannot simply be determined from target vehicle speed SR set by target vehicle speed setting portion 52. It is therefore necessary to search and determine an engine rotational speed at which engine torque TE counterbalances driving torque TS that corresponds to target vehicle speed SR.

Figure 5:
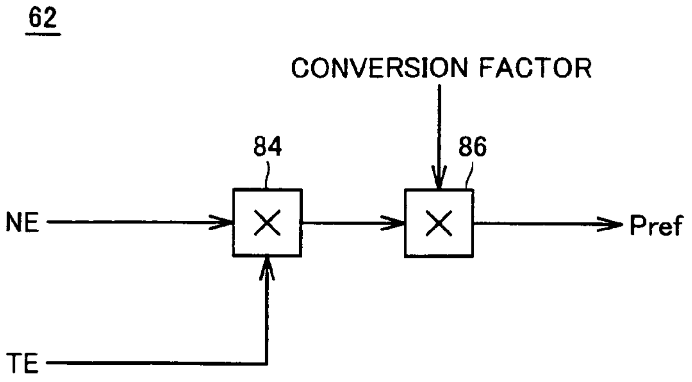
FIG. 5 is a detailed functional block diagram of a target power calculating portion shown in FIG. 2.

FIG. 5 is a detailed functional block diagram of target power calculating portion 62 shown in FIG. 2. Referring to FIG. 5, target power calculating portion 62 includes a multiplication portions 84, 86. Multiplication portion 84 multiplies target engine rotational speed NE from target engine rotational speed calculating portion 60 by engine torque TE from engine torque calculating portion 56, and outputs the multiplication result to multiplication portion 86. Multiplication portion 86 multiplies the multiplication result from multiplication portion 84 by a prescribed scale factor for unit conversion and the like, and outputs the multiplication result as target power Pref to engine controlling portion 44 of engine ECU 40 shown in FIG. 1.

As described above, according to the first embodiment, idle controlling portion 42 calculates target power Pref of engine 10 and engine controlling portion 44 controls engine 10 such that a power of engine 10 achieves target power Pref during idle control. Accordingly, the output torque of engine 10 during idle control is stabilized, and as a result the power of engine 10 during idle control is stabilized.

Furthermore, target power Pref of engine 10 is calculated without detecting the turbine rotational speed of torque converter 20. Therefore the problem of unstable output due to control delay does not occur. Furthermore, target power Pref of engine 10 is determined based on target vehicle speed SR to be obtained when the vehicle creeps, and hence an appropriate target power Pref is set. Furthermore, velocity ratio e of the input and output shafts of torque converter 20 and capacity coefficient C of torque converter 20 are used to calculate engine torque TE and target power Pref accurately, which makes it possible to set a desired target power Pref accurately.

Second Embodiment

In the first embodiment, a target power of engine 10 during idle control is a power required for the vehicle to creep at target vehicle speed SR. In the second embodiment, however, a target power of engine 10 during idle control is a power required to rotate engine 10 at a prescribed idle speed when the vehicle speed is zero.

The entire structure of the engine system in the second embodiment is similar to that of engine system 10 according to the first embodiment shown in FIG. 1.

Figure 6:
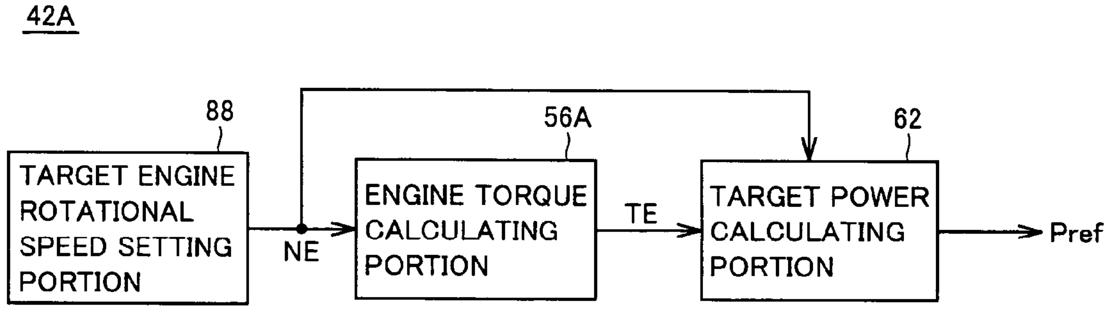
FIG. 6 is a functional block diagram of an idle controlling portion according to a second embodiment of the present invention.

FIG. 6 is a functional block diagram of an idle controlling portion in the second embodiment of the present invention. Referring to FIG. 6, an idle controlling portion 42A according to the second embodiment includes a target engine rotational speed setting portion 88, an engine torque calculating portion 56A, and a target power calculating portion 62. Target engine rotational speed setting portion 88 sets a prescribed target engine rotational speed NE for preventing an engine stall when the vehicle speed is zero, and outputs the set target engine rotational speed NE to engine torque calculating portion 56A and target power calculating portion 62.

Engine torque calculating portion 56A multiplies a capacity coefficient of torque converter 20 obtained when the velocity ratio of torque converter 20 is zero (the vehicle speed is zero and the turbine rotational speed is zero, and hence the velocity ratio is zero), by a square value of target engine rotational speed NE from target engine rotational speed setting portion 88, and outputs the multiplication result as engine torque TE to target power calculating portion 62.

Target power calculating portion 62 has already been described with reference to FIGS. 2 and 5, and therefore the description thereof will not be repeated.

As described above, the second embodiment can also produce the effect similar to that of the first embodiment.

In the first and second embodiments described above, engine 10 corresponds to "the internal combustion engine" in the present invention, and engine ECU 40 corresponds to "the control device of the internal combustion engine" in the present invention. Furthermore, idle controlling portion 42 corresponds to "the target power setting portion" in the present invention, and engine controlling portion 44 corresponds to "the controlling portion" in the present invention. Furthermore, torque converter 20 corresponds to "the fluid coupling" in the present invention, and transmission 30 corresponds to "the transmission mechanism" in the present invention.

Furthermore, engine torque calculating portions 56, 56A each corresponds to "the torque calculating portion" in the present invention, and target power calculating portion 62 corresponds to "the target power calculating portion" in the present invention. Furthermore, velocity ratio calculating portion 72 corresponds to "the velocity ratio calculating portion" in the present invention, and capacity coefficient calculating portion 74 corresponds to "the capacity coefficient calculating portion" in the present invention, and multiplication portions 76, 78 correspond to "the computing portion" in the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device of an internal combustion engine, the control device controlling a power from the internal combustion engine coupled to an automatic transmission, comprising:

a controlling portion that controls the power from said internal combustion engine; and a target power setting portion that sets a target power in said controlling portion in order to control the power from said internal combustion engine to keep the power from said internal combustion engine constant when a drive range is selected in said automatic transmission in an idle state of said internal combustion engine, wherein said controlling portion controls the power from said internal combustion engine based on said target power when said drive range is selected in said idle state.

2. The control device of the internal combustion engine according to claim 1, wherein said target power is a power required to achieve a target vehicle speed during creeping.

3. The control device of the internal combustion engine according to claim 1, wherein said target power is a power required to maintain a rotational speed of said internal combustion engine at a prescribed value when a vehicle speed is zero.

4. The control device of the internal combustion engine according to claim 1, wherein said automatic transmission includes a fluid coupling coupled to an output shaft of said internal combustion engine, and a transmission mechanism coupled to an output shaft of said fluid coupling, and wherein said target power setting portion includes a torque calculating portion that calculates a target value of an output torque from said internal combustion engine when said drive range is selected in said transmission mechanism in said idle state based on a first target rotational speed that is a target rotational speed of said internal combustion engine and a second target rotational speed that is a target rotational speed of the output shaft of said fluid coupling, and a target power calculating portion that calculates said target power based on said calculated target value of the output torque and said first target rotational speed.

5. The control device of the internal combustion engine according to claim 4, wherein said second target rotational speed is calculated based on a target vehicle speed during creeping.

6. The control device of the internal combustion engine according to claim 4, wherein said second target rotational speed is zero.

7. A control device of an internal combustion engine, the control device controlling a power from the internal combustion engine coupled to an automatic transmission, comprising:

a controlling portion that controls the power from said internal combustion engine; and a target power setting portion that sets a target power in said controlling portion that controls the power from said internal combustion engine to keep the power from said internal combustion engine constant when a drive range is selected in said automatic transmission in an idle state of said internal combustion engine, wherein said controlling portion controls the power from said internal combustion engine based on said target power when said drive range is selected in said idle state, wherein said automatic transmission includes a fluid coupling coupled to an output shaft of said internal combustion engine, and a transmission mechanism coupled to an output shaft of said fluid coupling, wherein said target power setting portion includes a torque calculating portion, when a drive range is selected in said transmission mechanism in said idle state, that calculates a target value of an output torque from said internal combustion engine based on a first target rotational speed that indicates a target rotational speed of said internal combustion engine and a second target rotational speed that indicates a target rotational speed of the output shaft of said fluid coupling, and a target power calculating portion that calculates said target power based on said calculated target value of the output torque and said first target rotational speed, and wherein said torque calculating portion includes a velocity ratio calculating portion that calculates a velocity ratio of an input shaft and the output shaft of said fluid coupling based on said first and second target rotational speeds, a capacity coefficient portion that calculates a capacity coefficient of said fluid coupling based on said calculated velocity ratio, and a computing portion that computes said target value of the output torque based on said calculated capacity coefficient and said first target rotational speed.

8. The control device of the internal combustion engine according to claim 1, wherein said internal combustion engine includes a gasoline engine.

9. A control device of an internal combustion engine, the control device controlling a power from the internal combustion engine coupled to an automatic transmission, comprising:

controlling means for controlling the power from said internal combustion engine; and target power setting means for setting in said controlling means a target power for controlling the power from said internal combustion engine to keep the power from said internal combustion engine constant when a drive range is selected in said automatic transmission in an idle state of said internal combustion engine, wherein said controlling means controls the power from said internal combustion engine based on said target power when said drive range is selected in said idle state.

10. The control device of the internal combustion engine according to claim 9, wherein said target power is a power required to achieve a target vehicle speed during creeping.

11. The control device of the internal combustion engine according to claim 9, wherein said target power is a power required to maintain a rotational speed of said internal combustion engine at a prescribed value when a vehicle speed is zero.

12. The control device of the internal combustion engine according to claim 9, wherein said automatic transmission includes a fluid coupling coupled to an output shaft of said internal combustion engine, and a transmission mechanism coupled to an output shaft of said fluid coupling, and wherein said target power setting means includes torque calculating means for calculating a target value of an output torque from said internal combustion engine when a drive range is selected in said transmission mechanism in said idle state based on a first target rotational speed indicating a target rotational speed of said internal combustion engine and a second target rotational speed indicating a target rotational speed of the output shaft of said fluid coupling, and target power calculating means for calculating said target power based on said calculated target value of the output torque and said first target rotational speed.

13. The control device of the internal combustion engine according to claim 12, wherein said second target rotational speed is calculated based on a target vehicle speed during creeping.

14. The control device of the internal combustion engine according to claim 12, wherein said second target rotational speed is zero.

15. A control device of an internal combustion engine, the control device controlling a power from the internal combustion engine coupled to an automatic transmission, comprising:

controlling means for controlling the power from said internal combustion engine; and target power setting means for setting in said controlling means a target power for controlling the power from said internal combustion engine to keep the power from said internal combustion engine constant when a drive range is selected in said automatic transmission in an idle state of said internal combustion engine, wherein said controlling means controls the power from said internal combustion engine based on said target power when said drive range is selected in said idle state, wherein said automatic transmission includes a fluid coupling coupled to an output shaft of said internal combustion engine, and a transmission mechanism coupled to an output shaft of said fluid coupling, wherein said target power setting means includes torque calculating means for, when a drive range is selected in said transmission mechanism in said idle state, calculating a target value of an output torque from said internal combustion engine based on a first target rotational speed indicating a target rotational speed of said internal combustion engine and a second target rotational speed indicating a target rotational speed of the output shaft of said fluid coupling, and target power calculating means for calculating said target power based on said calculated target value of the output torque and said first target rotational speed, and wherein said torque calculating means includes velocity ratio calculating means for calculating a velocity ratio of an input shaft and the output shaft of said fluid coupling based on said first and second target rotational speeds, capacity coefficient calculating means for calculating a capacity coefficient of said fluid coupling based on said calculated velocity ratio, and computing means for computing said target value of the output torque based on said calculated capacity coefficient and said first target rotational speed.

16. The control device of the internal combustion engine according to claim 9, wherein said internal combustion engine includes a gasoline engine.

17. The control device of the internal combustion engine according to claim 1, wherein said target power is calculated based on a power that is required to achieve a target vehicle speed when said drive range is selected in said automatic transmission in said idle state of said internal combustion engine.

18. The control device of the internal combustion engine according to claim 9, wherein said target power is calculated based on a power that is required to achieve a target vehicle speed when said drive range is selected in said automatic transmission in said idle state of said internal combustion engine.

* * * * *